J. REHAK.
MAIL CLASSIFYING MACHINE.
APPLICATION FILED JUNE 5, 1911.
1,060,943.
Patented May 6, 1913.
8 SHEETS—SHEET 1.
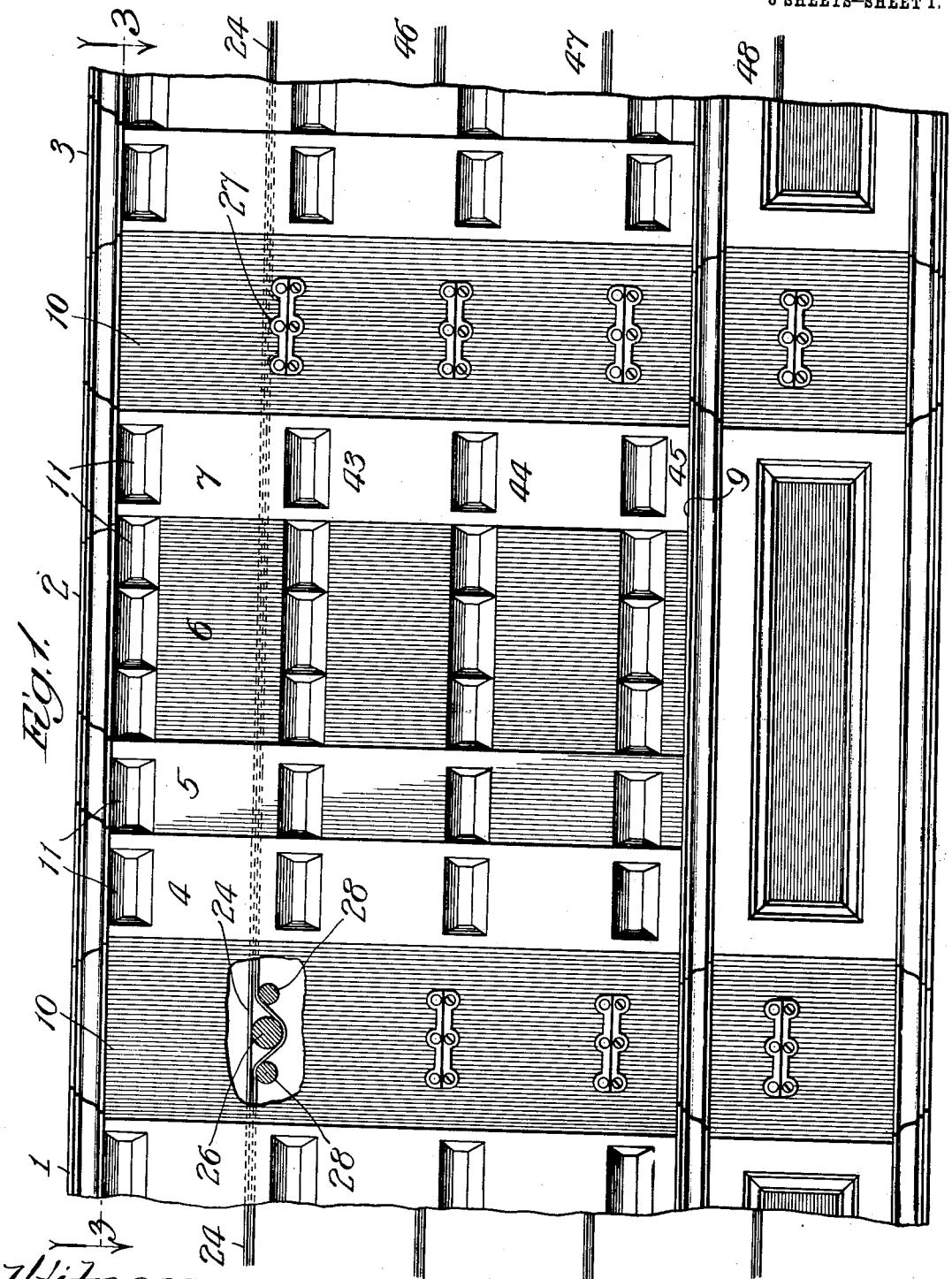

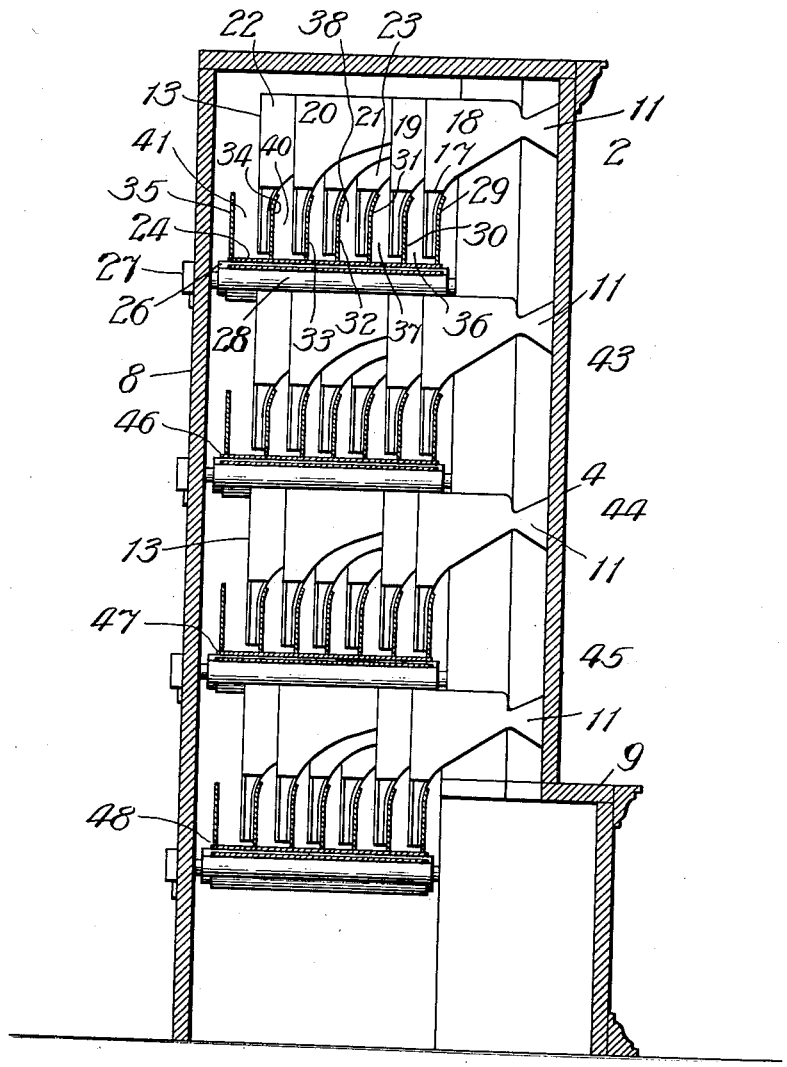

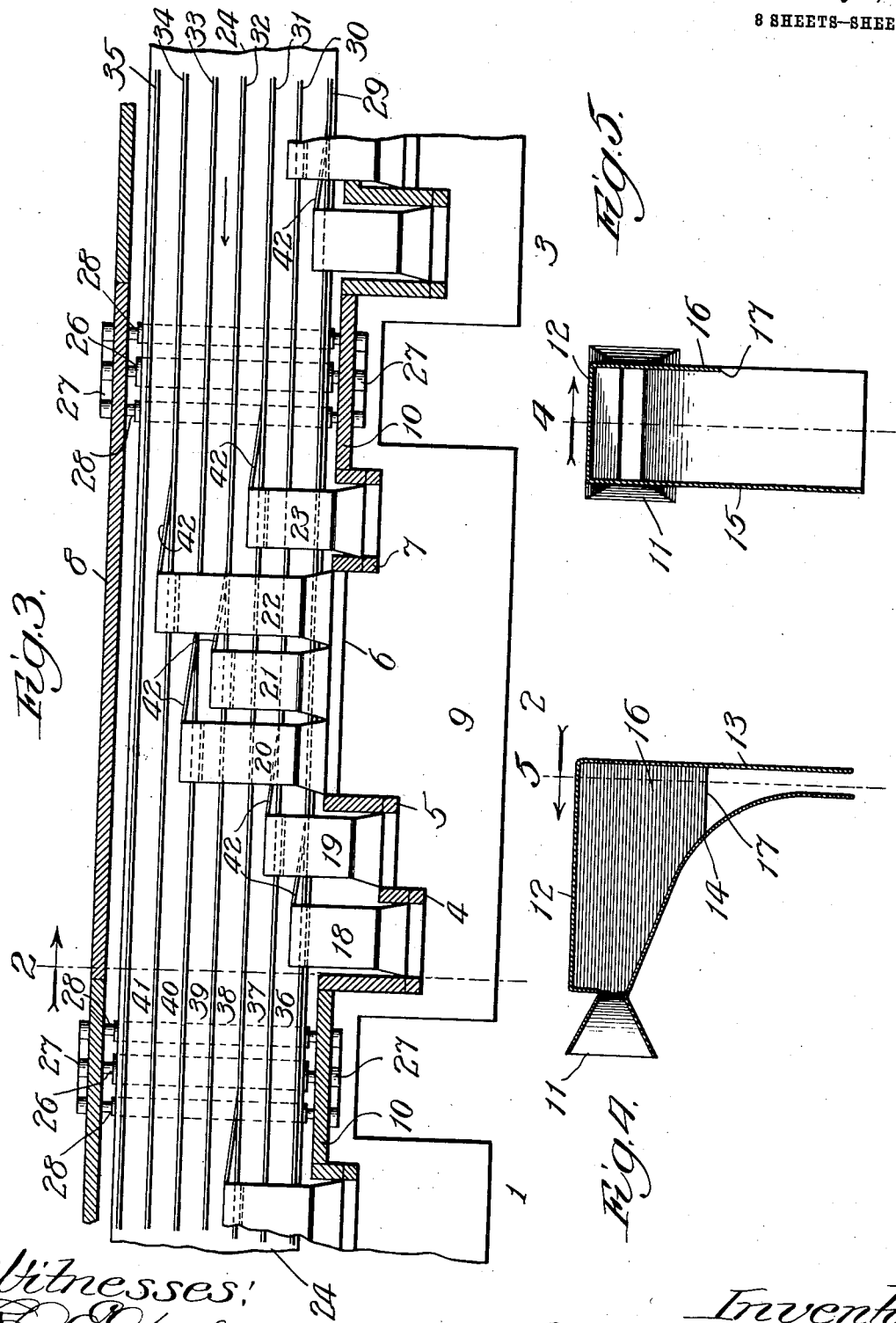

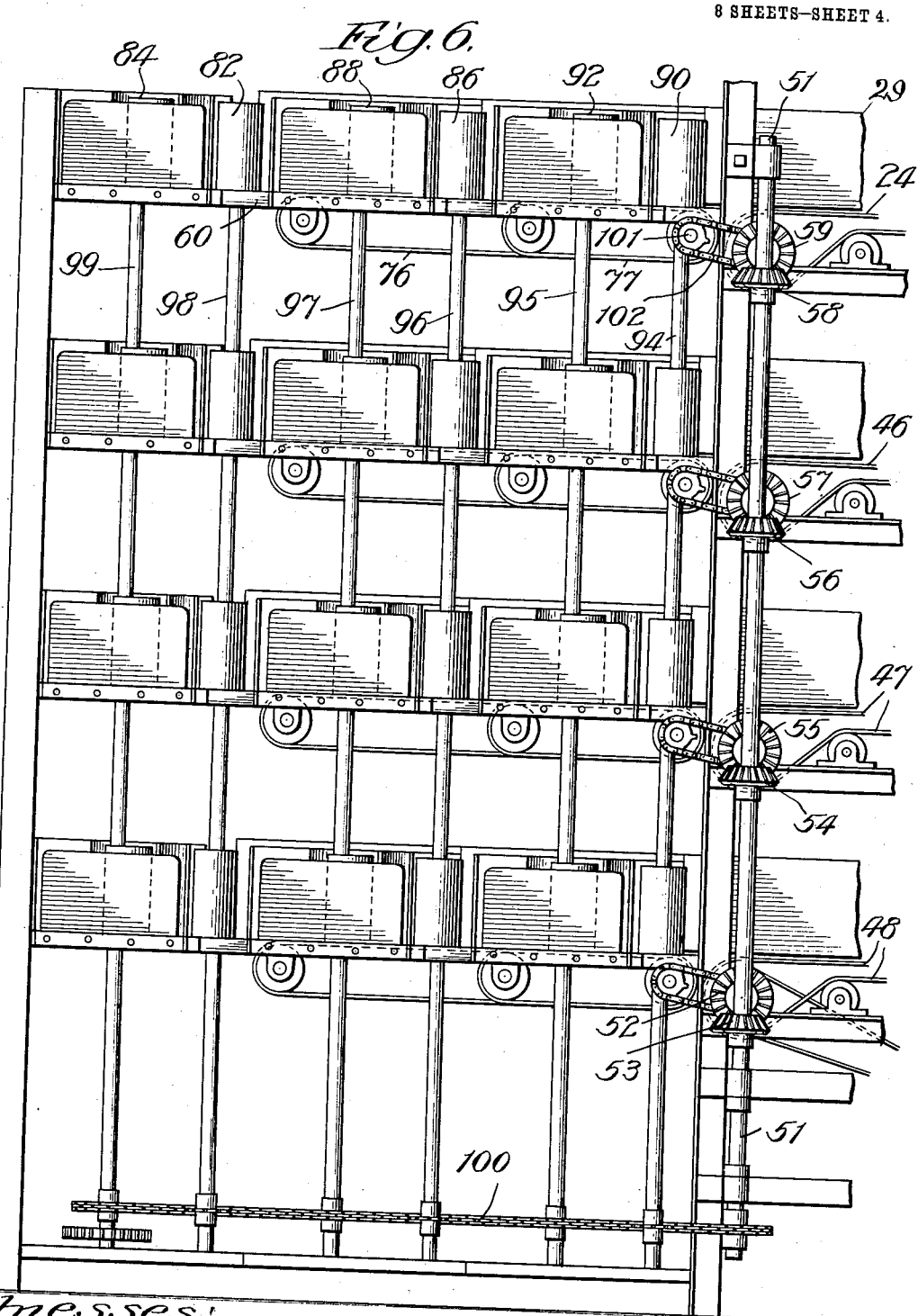

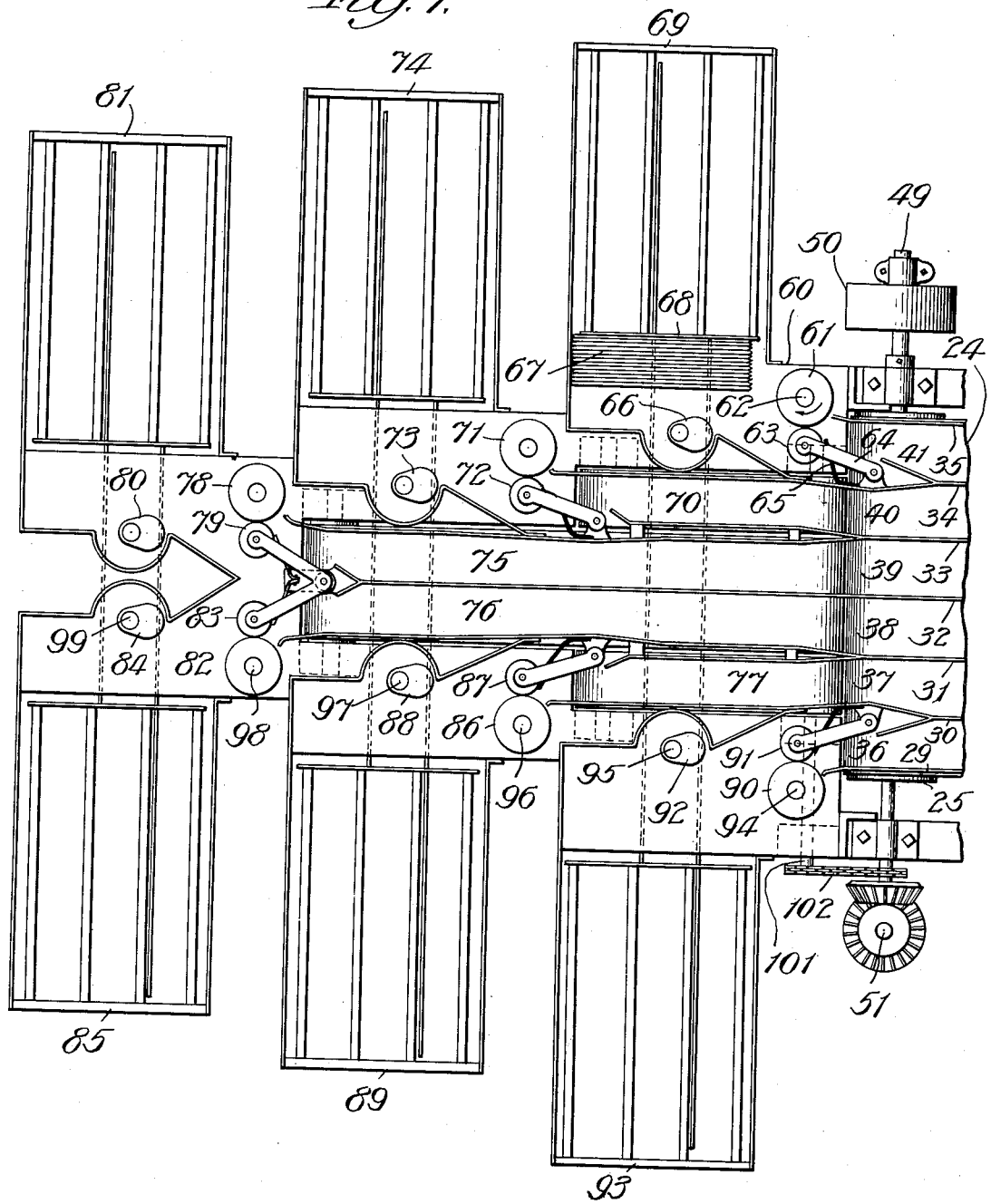

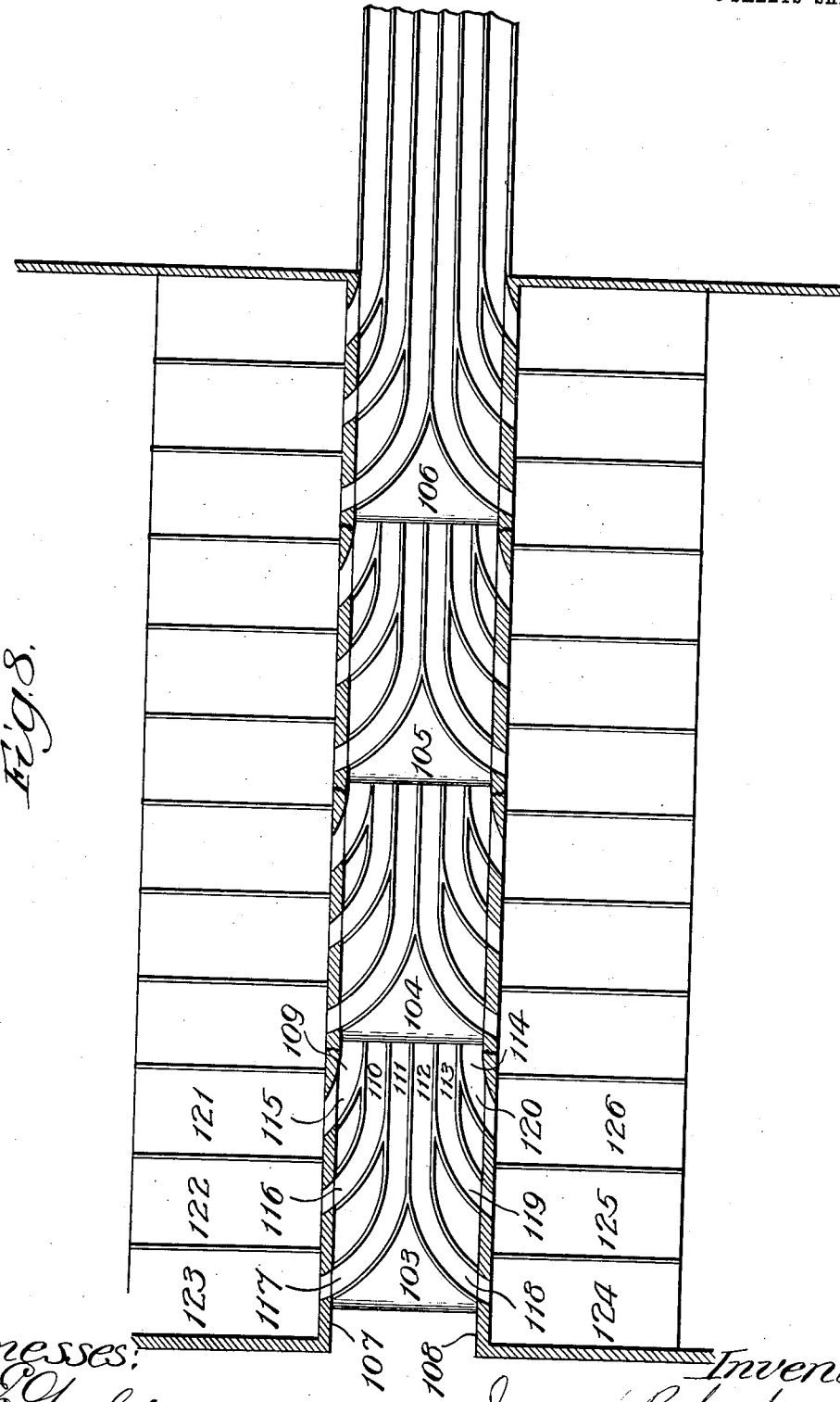

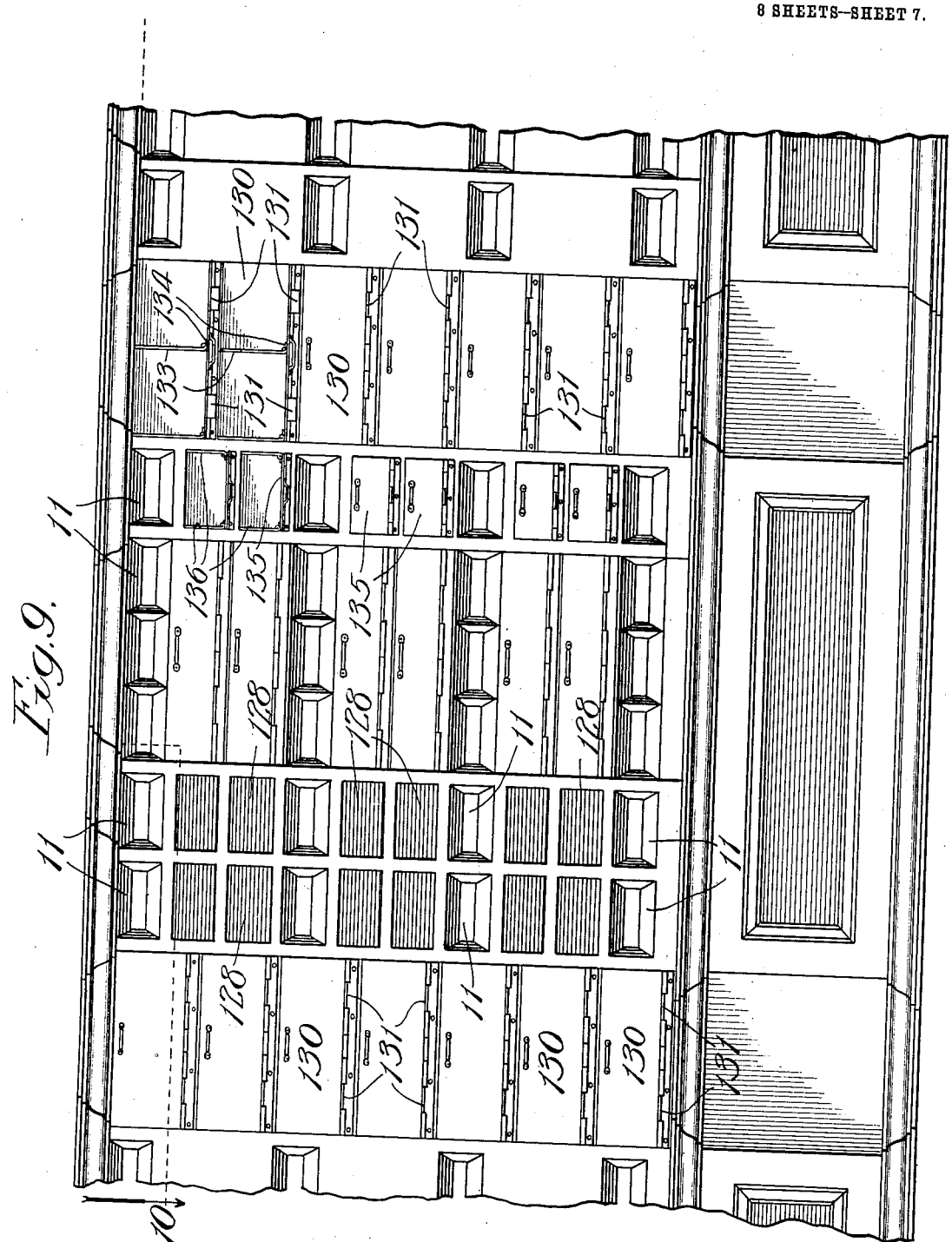

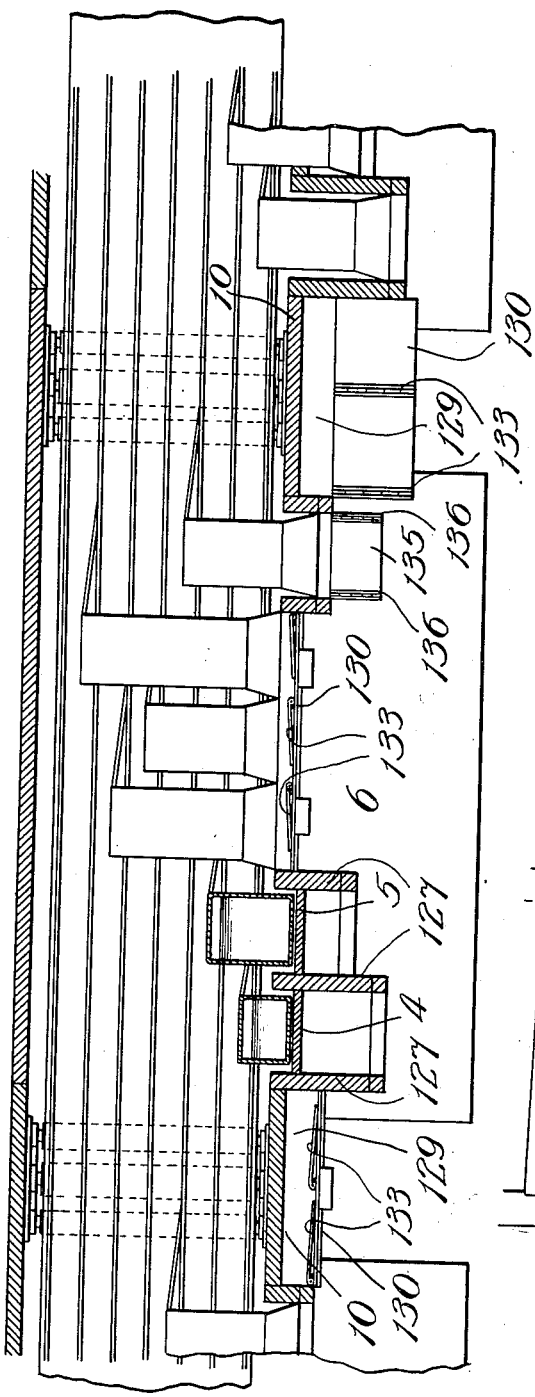
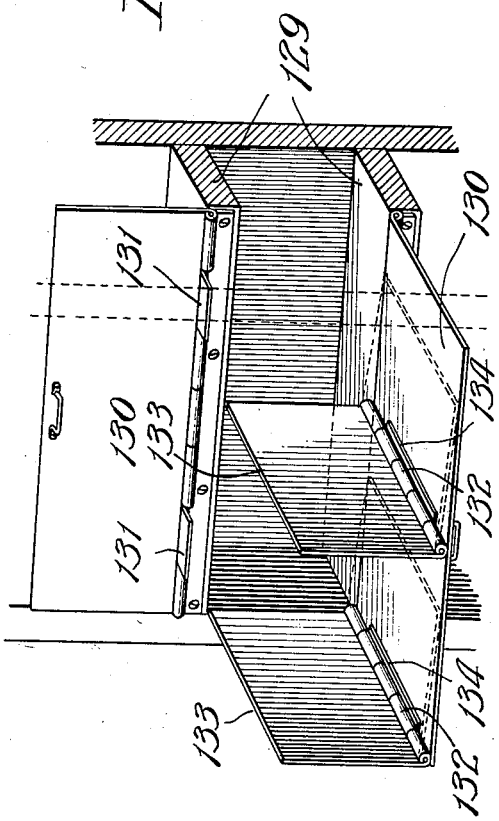

UNITED STATES PATENT OFFICE.

JAMES REHAK, OF CICERO, ILLINOIS, ASSIGNOR TO THE B. F. CUMMINS COMPANY, OF CHICAGO, ILLINOIS, A CORPORATION OF ILLINOIS.

MAIL-CLASSIFYING MACHINE.

1,060,943.   Specification of Letters Patent.   Patented May 6, 1913.

Application filed June 5, 1911. Serial No. 631,235.

*To all whom it may concern:*

Be it known that I, JAMES REHAK, a citizen of the United States, residing at Cicero, in the county of Cook and State of Illinois, have invented certain new and useful Improvements in Mail-Classifying Machines, of which the following is a description, reference being had to the accompanying drawings, forming a part of this specification, in which corresponding reference-numerals in the different figures indicate like parts.

My invention relates to apparatus for automatically facilitating the classification and conveyance to distinctive points for distribution of various articles requiring speedy and accurate classification, and is intended more especially for use in post-offices in the separation and transfer of mail to distinctive rooms or points therein according to its several destinations.

Heretofore it has been customary for a number of clerks to whom the canceled outgoing mail is delivered, to assort said mail and deposit it in pigeon holes for specific States, localities or countries. This mail so separated, is taken from the pigeon holes by other clerks, carried to the other points and there further separated and classified according to the mail routes of the respective States or countries. This practice necessitates frequent interruption in the work of the assorting clerks resulting in much confusion and loss of time.

The object of my invention is to overcome these difficulties and to avoid unnecessary delay by providing an apparatus whereby articles may be simultaneously separated by a large number of operatives, each of whom is free to do his work independently of the others and without interruption; said apparatus being so constructed and arranged as to simultaneously act in conjunction with all of the operators to carry the articles to their respective destinations in a given office so that they may be at once transferred to mailbags or other receptacles or conveyances without further handling, all of which is hereinafter more particularly described and definitely pointed out in the claims.

Referring to the drawings, Figure 1, is a view showing a front elevation of the apparatus, Fig. 2, is a vertical sectional view thereof taken upon the line 2, Fig. 3 viewed in the direction of the arrow there shown. Fig. 3, is a horizontal sectional view in plan, taken upon the line 3 3, Fig. 1, Fig. 4, is an enlarged vertical sectional view in detail of one of the chutes said view being taken upon the line 4, Fig. 5, Fig. 5, is a like view taken upon the line 5, Fig. 4, Fig. 6, is a side elevation of a portion of said apparatus showing the driving, separating, stacking and a portion of the conveying mechanism leading thereto, Fig. 7, is a plan view thereof, Fig. 8, is a plan view of a modified construction showing horizontal sections of portions of a series of conveyers together with the respective compartments or receptacles with which they communicate, Fig. 9, is a front elevation showing a modified construction, Fig. 10, is a horizontal sectional view thereof taken upon line 10, Fig. 9, and Fig. 11, is an enlarged detail view in perspective showing the manner of constructing the collapsible pigeon holes.

Referring to the drawings, 1, Figs. 1, 2, and 3, indicates a portion of a case or section, 2 a complete case and 3 a portion of a case all of which are uniform in construction and are arranged in alinement with each other.

The description of one section will suffice for the several duplicates, an indefinite number of which may be employed and I will therefore describe section 2 as the counterpart and representative of the others.

The front of each section is composed of a number of vertical panels 4, 5, 6 and 7 respectively, Figs. 1, 2 and 3, located in different vertical planes, while the back 8 may be in a straight line. A ledge 9 in front at the bottom of the panels may serve as a temporary support for articles to be classified. Between each of the adjacent sections is a panel 10, which serves as a support for the shaft bearings of parts of the conveying mechanism as hereinafter stated.

Each section is provided with a plurality of horizontal rows of chutes. In the example given I have shown four of such rows although the number may be varied. Each chute in a given section is intended to communicate with a separate conveying conduit, upon the same level, while each conduit upon said level is common to one chute upon each section located upon said level. The purpose of this arrangement is to enable a number of operators in different sections to transmit mail to a given destination at the same time by dropping it into corresponding chutes all of which communicate with the conduit leading to that destination. This requires a special arrangement and construction of the several chutes together with means for preventing mail-pieces from clogging as they pass those chutes in advance of those into which they are dropped. The several chutes are of substantially the same shape and differ only in length to enable them to extend to the respective conduits with which they are intended to communicate. The construction of said chutes is better shown in Figs. 2, 3, 4 and 5 in which 11 indicates a funnel shaped mouth, 12 a top wall, 13 a vertical wall, 14 a downwardly inclined front wall and 15 and 16 respectively side walls, the latter of which is cut away as shown at 17, for the purpose hereinafter stated.

The upper horizontal row of chutes, better shown in Figs. 2 and 3, are designated generally as 18, 19, 20, 21, 22 and 23 respectively, and the lower ends or spouts thereof are located in different vertical planes.

An endless horizontal belt 24 is mounted upon end rollers one of which, 25, is shown in Fig. 7, while the intermediate portions of said belt are supported upon rollers 26 having their shafts mounted in bearings 27 in the rear wall 8, and the panels 10. In order to economize space and hold the lower portion of the belt up close to the other, I provide rollers 28 upon opposite sides of the roller 26, as more clearly shown in Fig. 1, so that the upper and lower portions of said belt are caused to run very closely together without touching.

Extending lengthwise of the conveyer belt are a series of vertical partitions 29, 30, 31, 32, 33, 34 and 35, which serve respectively as side walls for conduits 36, 37, 38, 39, 40 and 41. The discharge openings of all of the chutes in a given horizontal row are upon a common level immediately above the belt and are preferably arranged to communicate with said conduit in the following order: the chutes 18 and 19 with the conduits 36 and 37, 20 and 21 with the conduits 40 and 39, and 22 and 23 with the conduits 41 and 38 respectively. When an article is dropped into a chute it falls upon the belt 24, and is carried thereby out through the opening below the side wall 16 in the chute and thence along the conduit to its destination as hereinafter described. Inasmuch however as the ends of the chutes are by preference caused to project downwardly into the conduits, it is not only essential that the discharge portions thereof be made narrower than the width of said conduits but that means should be provided within the conduits for preventing passing articles carried upon the belt from being brought into contact with said chutes as they pass the successive sections. In the example illustrated, the belt 24 is intended to be moved from right to left; and upon the right side of each chute there is extended at an acute angle from the partition wall to the rear wall of each chute a short deflecting wall 42, Fig. 3.

There are as many conveying belts corresponding to the belt 24, as there are horizontal rows of chutes in any given section. I have generally designated the horizontal rows of chutes shown in Figs. 1 and 2, aside from that described, as 43, 44 and 45 which communicate upon corresponding levels, with conveyer belts 46, 47, and 48 respectively which, with their connecting parts, correspond in every respect to the belt 24 The belt 48 is driven by means of a roller upon the shaft 49, Fig. 7, a pulley 50, upon said shaft being connected with any suitable source of power. A vertical shaft 51, Figs. 6 and 7 which is driven by means of miter gears 52 and 53, Fig. 6, serves through like gears 54 and 55, 56 and 57 and 58 and 59 respectively, to drive the belts 46, 47 and 24.

Each of the several conveyer belts leads to a series of separating and stacking devices located in operative proximity thereto and upon corresponding levels therewith. A description of one will suffice for all.

Upon a level with the upper face of the conveyer belt 24 is a shelf or support 60, upon which is located a separating roller 61, mounted upon a vertical shaft 62, and driven to conform to the direction of movement of the conveyer belt. An idler roller 63, is likewise mounted upon a vertical shaft having a bearing in the free end of a pivoted arm 64, which, by means of a spring 65, tends to press the rollers 62 and 63 together. As the articles, such for example as letters or other mail-pieces, are carried forward upon the belt 24 in the conduit 41, they are brought into contact with said rollers and advanced thereby. As said mail pieces pass outwardly they are acted upon by an eccentric rotary stacking cam 66 of well known construction, mounted upon a vertical shaft, the rotation of which acts in the usual way to press them into a stack 67 against a follower 68 upon a stacking frame 69.

The conduit 40 leads to a short conveyer belt 70 upon a corresponding level, which is in communication with like forwarding rollers 71, 72, a stacking cam 73 and a stacking rack 74. In like manner the conduits 39, 38 and 37 respectively lead to similar conveyer belts 75, 76 and 77. The belt 75 communicates with forwarding rolls 78, 79, a stacking cam 80 and a stacking rack 81, the belt 76 with like rolls 82, 83, cam 84 and rack 85, while the belt 77 coacts with the rolls 86, 87, a cam 88 and stacking rack 89. The conduit 36, like the conduit 41, communicates directly without an intervening belt, with forwarding rolls 90 and 91, stacking cam 92 and rack 93.

The rolls 90, 86, and 82, and the cams 92, 88 and 84 respectively, are mounted upon vertical shafts 94, 96, 98 and 95, 97 and 99 in the manner clearly shown in Fig. 6, which shafts are provided with suitable sprocket wheels and driven in unison by means of a sprocket chain 100, which is also arranged in like manner to drive the separating rolls and cams described upon the opposite side of the machine. The belts 70, 75, 76 and 77 are driven by means of a shaft 101, connected with the shaft upon which the roller 25 is mounted, by means of a sprocket chain 102 and suitable sprocket-wheels.

The operation of my improved classifying apparatus is as follows: Each chute in each section or case is labeled or numbered to represent a given State or district according to the most approved classification of those using it. A quantity of canceled mail-matter is then delivered to an operator in charge of each section, who rapidly deposits them according to their respective addresses, in chutes corresponding thereto, when they will be conveyed in the respective conduits to separating and stacking mechanism as described.

It will be noted that in the example illustrated there are four tiers of stacking racks and six racks in each tier. Assuming each to represent a State, it follows that the mail for twenty-four States could be classified with one apparatus. As the racks become filled the stacked mail therefrom can be transferred to appropriate sacks and will require no further attention until redistributed therefrom upon arrival at its destination.

The capacity of my improved apparatus may be varied indefinitely and it may be used with or without separating and stacking mechanism although I prefer to employ those features.

In Fig. 8, I have shown a modified construction in which the conveying belts, designated as 103, 104, 105 and 106 respectively, are placed one above the other in successive order between vertical side walls 107 and 108. Above the belt 103 there is provided a series of conduits 109, 110, 111, 112, 113 and 114, each of which is curved laterally in successive order as they approach the end of the belt, one half being preferably curved to the right and the other half to the left, so as to form eduction outlets 115, 116, 117, 118, 119 and 120 respectively, leading through suitable openings in the walls 107 and 108, into rooms or compartments 121, 122, 123, 124, 125 and 126, each of which represents a certain State, district or destination. The belts 104, 105 and 106 are successively shortened and are provided with conduits arranged in the same manner so that the discharge of each conduit will lead to a separate room or compartment, corresponding to those already described. Said rooms may or may not be provided with stacking mechanism but I prefer some means for arranging or bunching them in compact form. This arrangement of the belts and conduits enables a series of rooms or receptacles to be located in successive order upon opposite sides of the conveyers, thereby minimizing the space required.

In Figs. 9, 10 and 11 I have shown a modified construction intended to enable the separating clerks to continue the work of separation and classification should it become necessary to arrest the action of the machine from any cause, such, for example, as the breaking of a belt or other part which would need to be repaired. This result may be accomplished by means of a series of pigeon holes in each case so arranged in conjunction with the respective chutes that as the mechanism of the apparatus is stopped the clerks in front of the several cases may continue the work of separation by depositing the mail in properly classified pigeon holes arranged in proximity to said chutes. In order to economize space, I prefer to make a portion at least of said pigeon holes or boxes collapsible, although in some cases rigid boxes or compartments may be employed to advantage. For example, in the panels 4 and 5, I have extended the side walls 127 and have thereby provided for four open boxes or compartments 128 in the spaces between the chutes 11. In the panels 6 and 7 respectively and also in the two panels 10 I have provided for collapsible boxes which may be constructed as follows: Hinged to horizontal cross-bars 129 attached to the panels 6 and 10 respectively, are doors or shelves 130 each of which is provided with a flange or projection 131 arranged at right angles to the plane of the shelf and rigidly attached thereto at the hinge so as to bear against the vertical face of the part 129, when said shelf is in horizontal position to form a stop and support said shelf in the manner more clearly represented in Fig. 11. Hinged to the inner face of each of the shelves 130, so as to extend across the same from front to rear as shown at 132, are partition members 133 which are adapted to fold flatly against said shelves when not in use as shown in Fig.

10 and indicated in dotted lines in Fig. 11. Stops 134, are rigidly attached to said members to limit their movement and hold them at right angles to said shelves when unfolded. Said shelves are provided with handles and when not in use, the parts 134 are folded flatly against the inner faces thereof and the shelves are in turn folded against the case or panel, when they would present the appearance shown at the left in Fig. 9. When, however, their use becomes necessary they are placed horizontally as shown in Fig. 11 and the upper right hand portion of Fig. 9 and the members 133 placed vertically so as to form partitions or side walls as the case may be.

In the panel corresponding to the panel 7 of Fig. 1, short shelves 135 are shown with members 136 hinged at the respective ends so as to fold normally upon each other and when unfolded, to form side walls for the respective compartments.

The several compartments should be marked to conform to the desired classification so that as soon as the mechanism of the apparatus is arrested in its movement the reserve compartments may be utilized and the classified destribution continued therein. The mail matter so distributed may be removed from time to time to the requisite points or in the event of a brief stoppage it may be placed in the proper chutes as soon as the action of the apparatus is resumed.

It is obvious that the construction of my improved classifying device may be greatly varied without departing from the principle involved and I do not wish to be limited to the specific details above set forth.

Having thus described my invention, what I claim as new and desire to secure by Letters-Patent is:—

1. In a mail classifying apparatus, the combination with a conveying belt, of a chute having a downward discharge portion narrowed at the mouth in a plane substantially parallel to the direction of movement of said conveying belt, the width of said discharge portion being less than that of the space upon the belt to be utilized as a conduit, said chute having a relatively narrow discharge opening leading in the direction of said movement and a shield in the rear of said chute for laterally guiding articles moving upon said belt past said chute.

2. In a mail classifying apparatus, the combination with a substantially horizontal conveying belt and means for actuating the same, of a chute arranged above and adjacent to said belt, said chute having a narrow, downwardly directed delivery opening arranged to discharge upon said belt, a space being provided upon said belt for the passage of mail pieces, and a substantially vertical rearwardly extended deflector arranged at an angle to the edge of said belt to deflect mail-matter past said chute.

3. In a mail classifying apparatus, the combination with a conveying channel having substantially vertical parallel walls for supporting mail-pieces upon their edges and a conveying belt forming the bottom of said channel, of a chute having a delivery portion comprising walls arranged to extend downwardly into said conveying channel in close proximity to the surface of said belt, the width of said delivery portion being less than that of said channel and a diagonally arranged deflector at the rear of said chute extending from one wall of the channel to the edge of the chute to guide mail-pieces past said chute.

4. In a mail classifying apparatus, the combination with a conveying channel having substantially vertical parallel walls for supporting mail-pieces upon their edges and a conveying belt forming the bottom of said channel, of a plurality of chutes common to said channel, each chute having a delivery portion comprising walls arranged to extend downwardly into said conveying channel in close proximity to the surface of said belt, the width of said delivery portion being less than that of said channel and means at the rear of each of said chutes except the first, for deflecting mail pieces into the channel past said chutes.

5. In a mail classifying apparatus, the combination with a conveying channel having substantially vertical parallel walls for supporting mail-pieces upon their edges and a conveying belt forming the bottom of said channel, of a plurality of chutes common to said channel, each chute having a delivery portion extending downwardly into said conveying belt, the side walls of the portion within said channel being substantially parallel, the width of said delivery portion being less than the width of said channel, the forward part of said delivery portion being cut away to permit the free passage of the mail-pieces upon their edges and means at the rear of each of said chutes, except that at the beginning of the series, for guiding mail-pieces through the channel past said chutes.

6. In a mail classifying apparatus, the combination with a conveying channel having substantially vertical parallel walls for supporting mail-pieces upon their edges and a conveying-belt forming the bottom of said channel, of a mail-chute having a substantially horizontal receiving slot located adjacent to said channel, said chute having a delivery portion extending laterally and downwardly from said receiving slot into said conveying channel into close proximity to said conveying belt, the side walls of the portion within said channel being substantially vertical and substantially parallel to each other, while the distance between them is greater than the width of said receiving-slot, said chute being open in the direction of movement of said belt to permit said mail pieces to be moved outwardly therefrom upon the belt.

In testimony whereof, I have signed this specification in the presence of two subscribing witnesses, this first day of October, 1910.

JAMES REHAK.

Witnesses:
DAVID H. FLETCHER,
JENNIE L. FISKE.